United States Patent [19]

Scott

[11] 3,941,694

[45] Mar. 2, 1976

[54] PROCESS FOR REDUCING THE ADHERENCE OF OIL TO SILICEOUS MATERIAL

[75] Inventor: Paul R. Scott, Houston, Tex.

[73] Assignee: Shell Oil Company, Houston, Tex.

[22] Filed: Apr. 20, 1971

[21] Appl. No.: 135,760

Related U.S. Application Data

[63] Continuation-in-part of Ser. No. 15,952, March 2, 1970, abandoned.

[52] U.S. Cl. .................................. 210/40; 210/59
[51] Int. Cl.² ........................................ C02B 9/02
[58] Field of Search .............. 210/40, 59, DIG. 21; 252/312, 351, 356

[56] References Cited

UNITED STATES PATENTS

| | | | |
|---|---|---|---|
| 2,447,551 | 8/1948 | Zisman et al. | 252/312 |
| 3,518,183 | 6/1970 | Evans | 210/40 |
| 3,625,857 | 12/1971 | Weimer et al. | 252/351 X |
| 3,639,255 | 2/1972 | Boardman | 252/351 X |
| 3,657,125 | 4/1972 | Strickman | 210/40 |

OTHER PUBLICATIONS

Naval Research Laboratory Report No. P-1930, W. A. Zisman, 9/1942, Unclassified, 12/1951.

Naval Research Laboratory Report No. P-1984, W. A. Zisman, 1/1943, Unclassified, 5/1958.

*Primary Examiner*—Thomas G. Wyse

[57] ABSTRACT

The adherence of oil to siliceous material, such as beach sand, is reduced by contacting the material with a blend of a primary long chain alcohol and an aliphatic solvent either before or after the oil contacts the siliceous material.

11 Claims, No Drawings

PROCESS FOR REDUCING THE ADHERENCE OF OIL TO SILICEOUS MATERIAL

REFERENCE TO RELATED APPLICATION

This application is a continuation-in-part of application Ser. No. 15,952, filed Mar. 2, 1970, now abandoned.

BACKGROUND OF THE INVENTION

Many of the beaches of the world have been despoiled in recent years by oil spills. Oil tankers wrecked at sea and discharge of bilge water by ships at sea have accounted for large quantities of oil which has eventually washed onto beaches. Not only have such beaches suffered a considerable aesthetic loss, but also marine life and water fowl in the vicinity of the beaches have been eradicated. As a result, considerable efforts by many parties have been devoted to developing various means not only to prevent oil from contacting such beaches, but also to clean such beaches after they have been contacted by oil. Such efforts have to date been very expensive and only modestly successful.

One of the more usual methods of protecting beaches is through the use of straw. The straw is spread at the waters edge in order to catch incoming oil slicks. Once the straw has been soaked with oil it must be immediately retrieved or it will sink, making retrieval difficult. At best, the straw is highly inefficient and much oil passes through it and soaks into the beach sand. The oil soaked sand must then be picked up and taken to waste disposal and fresh clean sand deposited in its place. As evident, the use of straw alone is not entirely satisfactory for several reasons.

The present invention overcomes the above described difficulties and provides a successful solution to the problems of the prior art, as will be apparent from the following description thereof.

SUMMARY OF THE INVENTION

The primary purpose of this invention resides in providing a method for the control of oil spills which can be employed to prevent such spills from contaminating beaches and shore lines.

The above purpose has been achieved through the utilization of a surface active chemical agent which reduces the adherence of oil to siliceous material such as beach sand.

The method of this invention broadly extends to reducing the adherence of oil to siliceous material by contacting the material with a blend of a primary long chain aliphatic alcohol and an aliphatic solvent.

Within the framework of the above described process, the present invention not only solves the above mentioned problems of the prior art, but also achieves further significant advantages as will be apparent from the description of preferred embodiments following.

DESCRIPTION OF THE PREFERRED EMBODIMENTS

The method of the present invention is largely independent of inconveniences inherent in most existing means for cleaning beach sands or other siliceous materials. Not only is the present method effective under inclement weather conditions, but it also is highly mobile and even air transportable. Generally, the method involves distributing surface active chemicals either at the waters edge so as to be washed onto the beach sand or directly onto the sand. Either way, the method serves to keep the beach sand or other siliceous material from becoming impregnated with oil so that the oil may then be picked up rather easily by sorbents for example.

The surface active chemical may be distributed onto the sand or siliceous material either before or after contact of the sand or siliceous material with oil. If distributed before oil contact, the chemical serves to keep the sand or other material from becoming oil impregnated. Thus, the oil stands in drops or puddles on the treated sand or other material which is water wet and does not spread or soak thereinto. If distributed after oil contact, the chemical serves to clean the sand or other material by eluting the oil therefrom by a displacement action.

The surface active chemical preferred for use with the invention is a non-toxic blend of a primary essentially straight long chain aliphatic alcohol having some branching of less than 5% and having the formula R—OH where R is preferably a straight-chain alkyl or alkenyl radical of from 10 to 20 and preferably 12 to 15 carbon atoms, the alcohol being dispersed in a polar aliphatic solvent containing at least one hydroxyl, ether, ester, keto, keto-alcohol, keto-ether, keto-ester, or ether-alcohol group in the molecule, the alcohol being dispersable in concentrations of from 10 to 85% by weight or greater, in the solvent. The solvent increases the rapid spreading of the aliphatic alcohol on the water surface and prevents solidification of the alcohol-solvent blend at temperatures below 50°F.

Primary long chain aliphatic alcohols useful for forming oil slick combating blends of the present invention should contain at least 10 carbon atoms in the molecule, preferably between 12 and 15 carbon atoms, and are commercially available from the Shell Chemical Company under the trade name of Neodol, such as Neodol 23, 25, and 45 wherein the figures indicate the number of carbon atoms in the alkyl radical; thus, Neodol is essentially a straight-chain primary aliphatic alcohol R—OH wherein R can be a $C_{12-13}$, $C_{12-15}$, or $C_{14-15}$ alkyl radical, respectively. The properties of such alcohols are shown in Table 1.

TABLE 1

| PROPERTY | NEODOLS | | |
| --- | --- | --- | --- |
| | 25 | 23 | 45 |
| Molecular Weight | 207 | 197 | 221 |
| Active Content, %W | 100 | 100 | 100 |
| Melting Range, °C. | 21–23 | 21–22 | 22–23 |
| Color, APHA | 20 | 20 | 20 |
| Sp. Gravity, 25/25°C. | 0.834 | 0.830 | 0.834 |
| Viscosity, cs at 100°F. | 18.3 | 18.9 | 29.3 |
| Acid Value, eg/100g | <0.0001 | <0.0001 | <0.0001 |
| Carbonyl Value, ppm as CO | 80 | 80 | 70 |
| Hydroxyl Value, eg/100g | 0.483 | 0.517 | 0.458 |
| Hydroxyl Number, mgKOH/g | 271 | 288 | 256 |
| Flash Point, °F* | 310 | 310 | 310 |
| Odor | Mild | Mild | Mild |

*Tag Open Cup

Aliphatic solvents particularly preferred are the mono- and di-ethers or corresponding esters of alkylene glycol wherein the alkylene radical is ethylene and/or propylene and wherein such compounds can be represented by formulas:

(1) $R'-(OR'')_n-OH$ (2) R'—(OR")n—OR' of the composition. Suitable blends are shown in Table 3 below.

TABLE 3

| | | Properties of Neodol Blends | | | | |
|---|---|---|---|---|---|---|
| Blend No. | Test Temp., °F. | Neodol 25, %v | Butyl Oxitol, %v | Surface Tension, dyne/cm | Pour Point, °F. | Specific Gravity at 77°F. gm/ml |
| A | 80 | 100 | 0 | 32.3 | 71 | 0.834 |
| B | 80 | 90 | 10 | 28.9 | 54 | 0.844 |
| C | 80 | 80 | 20 | 28.8 | 48 | 0.849 |
| D | 80 | 70 | 30 | 28.5 | 42 | 0.855 |
| E | 80 | 60 | 40 | 28.5 | 36 | 0.860 |
| F | 80 | 50 | 50 | 28.1 | 31 | 0.867 |
| | | | Isopropyl Alcohol %v | | | |
| G | 88 | 100 | 0 | 32.3 | 70 | 0.834 |
| H | 88 | 85 | 15 | 29.7 | 42 | 0.826 |
| I | 88 | 80 | 15* | 27.6 | 49 | 0.829 |
| J | | 95 | 5 | | 56 | |
| K | | 90 | 10 | | 46 | |

*80%v Neodol 25; 15%v Isopropyl Alcohol; 5%v Neodol 25-3

(3) R'COOR"— OH (4) R'COO(R" — O)ₙOH (5) R'COOR" — OOCR'

(6) R'COO(R"O)ₙR'OOCR' wherein R' is an alkyl radical of from 4 to 20 carbon atoms, R" i an alkylene radical of 2 or 3 carbon atoms, e.g., ethylene, and n is an integer of 1 or 2; preferred are the mono $C_{4-10}$ alkyl ethers of ethylene and/or propylene glycol such as monobutyl ether of ethylene glycol, mono- pentyl ether of ethylene glycol, mono octyl ether of ethylene glycol, mono butyl ether of propylene glycol. Solvents of this invention can be prepared by methods well known in the art as described in U.S. Pat. Nos. 2,816,932; 2,870,220; 2,998,572; 3,281,477; 3,282,843; 3,294,848; 3,321,533; and 3,431,308. Preferred solvents are the mono- and di- butyl ethers of ethylene glycol commercially available from Shell Chemical Company under the trade name Butyl Oxitol and Butyl Dioxitol which have the following properties. (See Table 2).

EXAMPLE I

A beach area exposed to a threat of oil intrusion was simulated in the laboratory. Neodol 25 (60%v), Butyl Oxitol (40%v) blend (Blend E, Table 3,) was added to sea water off an artificial beach area. Artificial waves exposed the beach area to the Neodol layer. Shallow Yates crude was added to the sea water off the beach area and was subsequently washed ashore by waves and currents. The oil did not wet the sand to the depth and the area covered by oil was less than for a similar beach exposed to Shallow Yates crude when no Neodol was present ashore. Wetting the beach with Neodol lessened the damage due to oil wetting.

EXAMPLE II

Example I was repeated with the following variations: (a) the sand was prewet with water, Blend E was applied thereto, and finally the sand was contacted with oil; (b) Blend E was applied to dry sand, and then the sand was contacted with oil; (c) the sand was soaked with oil, Blend E was applied thereto, and last the sand

TABLE 2

| | Chemical Formula | Molecular Weight | Specific Gravity 20/20°C. | Boiling Pt. 760 mm. Hg. | Vapor Pressure at 20°C. mm. Hg. |
|---|---|---|---|---|---|
| Butyl OXITOL | $C_4H_9$ O $CH_2$ $CH_2$ OH | 118.17 | 0.9019 | 171.2 | 0.6 |
| Butyl DIOXITOL | $C_4H_9$ $CH_2$ $CH_2$ O $CH_2$ $CH_2$ OH | 162.23 | 0.9536 | 230.4 | 0.02 |
| | Refractive Index 20 D | Latent Heat of Vaporization cal/gm. | Solubility with water gms/100gms. of Solution at 20°C | | |
| | | | Compound in water | Water in Compound | |
| Butyl OXITOL | 1.4193 | 95 | Complete | Complete | |
| Butyl DIOXITOL | 1.4316 | 62 | Complete | Complete | |
| | Coefficient of Expansion per °C., at 20°C. | Specific Heat at 20°C., cal/gm. | Flash Point, °F ± Tag Open Cup | | |
| Butyl OXITOL | 0.00092 | 0.583 | 165 | | |
| Butyl DIOXITOL | 0.00085 | 0.546 | 240 | | |
| | VISCOSITIES | | | EVAPORATION RATES | |
| | R.S. ½" NC at 25°C (Centipoises) | Neat at 25°C Comm. Prod. (Centipoises) | Relative n-BUOAC = 1.0 | Shell Thin Film Evaporometer to 90% Evap. in Sec. | |
| Butyl OXITOL | 107 | 2.9 | 0.06 | 8,125 | |
| Butyl DIOXITOL | 215 | 5.3 | 0.01 | — | |
| | DILUTION RATIO | | | | |
| | Toluene    Aliphatic Naphtha | | | | |
| Butyl OXITOL | 3.3         1.8 | | | | |
| Butyl DIOXITOL | 3.9         1.9 | | | | |

The alcohols and solvents of the present invention may be blended to control surface tension spreading properties and melting ranges in order to achieve greatest effective oil elution. In general, the alcohol should constitute the major portion, e.g. 50 to 60% by weight, was contacted with water; (d) the sand was prewet with water, then oil soaked, and finally Blend E applied thereto. In each variation the surface active chemical substantially reduced the adherence of the oil to the sand.

As above mentioned, once the sand, other siliceous material, or the like, has been treated with surface active chemical and the oil is restricted to droplets or puddles at the surface of the waterwetted sand or other material, the oil may be recovered by conventional means, for example sorbents. A roller having a polyurethane foam facing which may be rolled down the beach or other area and periodically cleaned or have its foam facing replaced, is especially suitable for picking up the oil. Of course, other polymers known to the art as well as cork, rubber, straw and the like, may be employed with this or other suitable known apparatus.

I claim as my invention:

1. A method for reducing the adherence of oil to siliceous material comprising contacting the material with a blend of a primary long chain aliphatic alcohol having from 10 to 20 carbon atoms with a polar-containing aliphatic solvent.

2. The method of claim 1 wherein the alcohol is a $C_{12-15}$ primary aliphatic alcohol having less than 5% branching and the solvent is selected from a group consisting of ether and ester derivatives of an alkylene glycol.

3. The method of claim 1 wherein the alcohol is a $C_{12-13}$ primary aliphatic alcohol having less than 5% branching and the solvent is selected from a group consisting of ether and ester derivatives of an alkylene glycol.

4. The method of claim 1 wherein the alcohol is a $C_{14-15}$ primary aliphatic alcohol having less than 5% branching and the solvent is selected from the group consisting of ether and ester derivatives of alkylene glycol.

5. The method of claim 1 wherein the solvent is a mono $C_{4-10}$ alkyl ether of ethylene glycol.

6. The method of claim 1 wherein the solvent is a mono butyl ether of ethylene glycol.

7. The method of claim 1 wherein the alcohol consists of from 50 to 60 percent of the blend and the balance is mono butyl ether of ethylene glycol.

8. The method of claim 1 wherein the siliceous material is sand.

9. The method of claim 1 wherein the siliceous material is contacted with the blend before being contacted with oil.

10. The method of claim 1 wherein the siliceous material is contacted with the blend after being contacted with oil.

11. The method of claim 1 including recovering the oil with sorbents.

* * * * *